March 23, 1954
J. W. DONEGAN
2,672,908
NONSKID MOTOR VEHICLE TIRE
Filed June 4, 1951
3 Sheets-Sheet 1
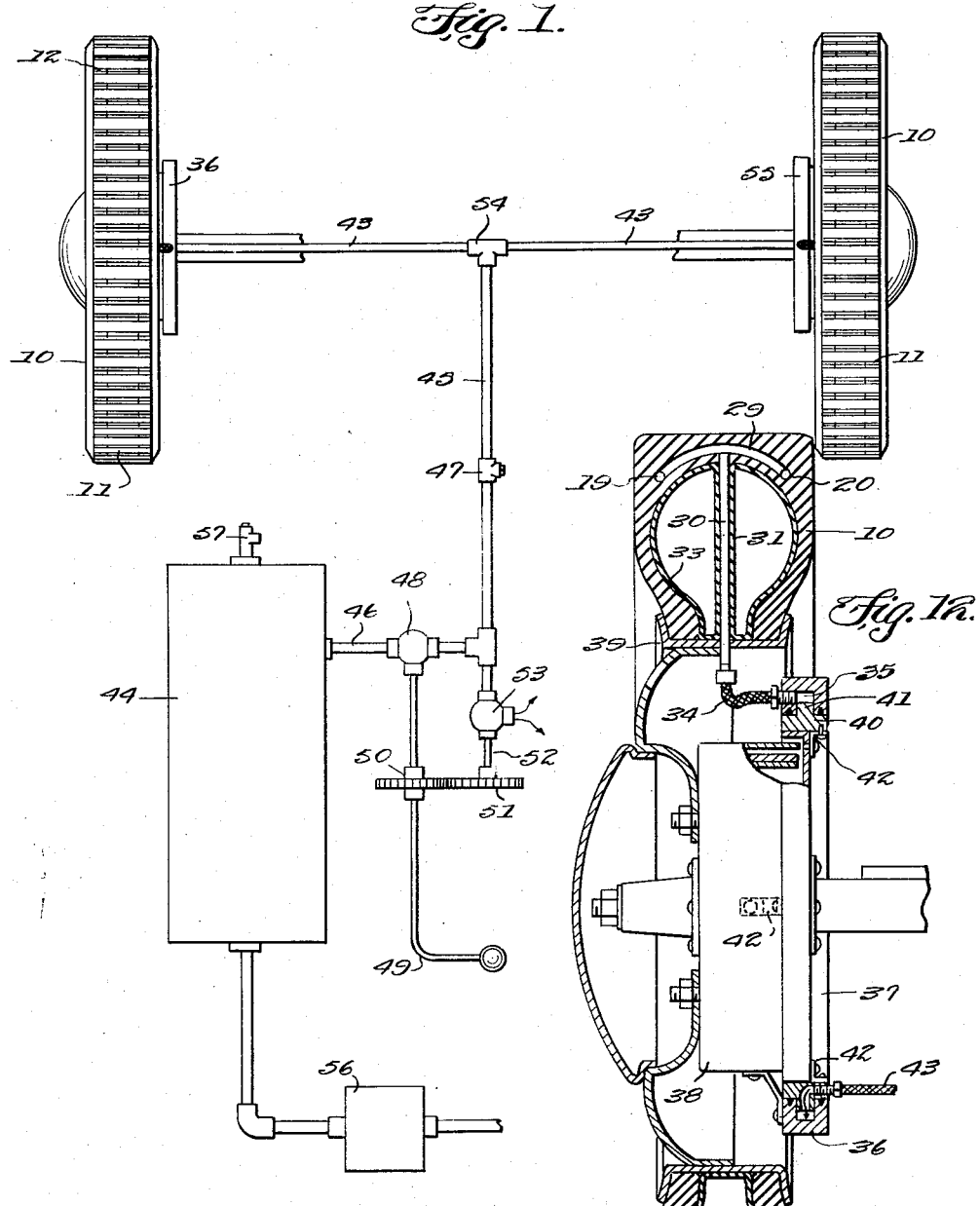
INVENTOR.
James W. Donegan,
BY 
ATTORNEYS March 23, 1954 J. W. DONEGAN 2,672,908
NONSKID MOTOR VEHICLE TIRE
Filed June 4, 1951 3 Sheets-Sheet 2
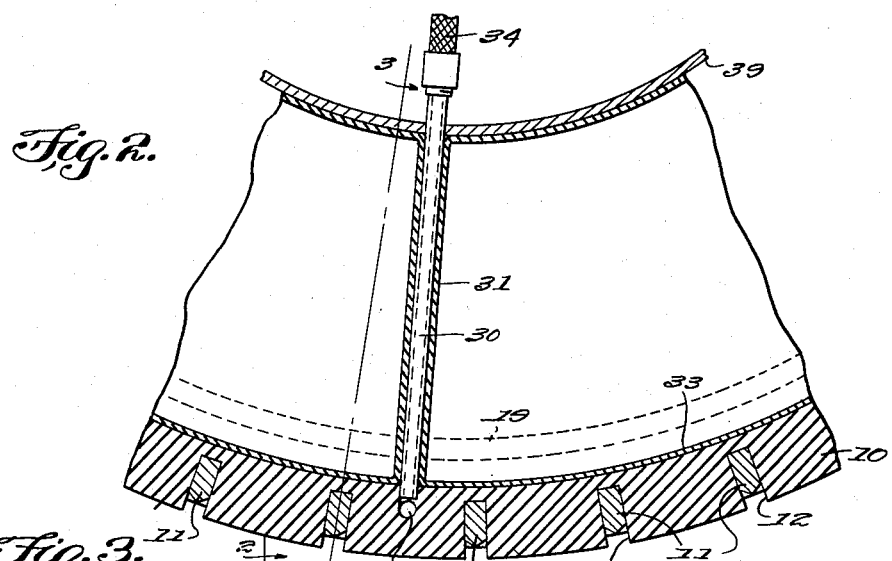
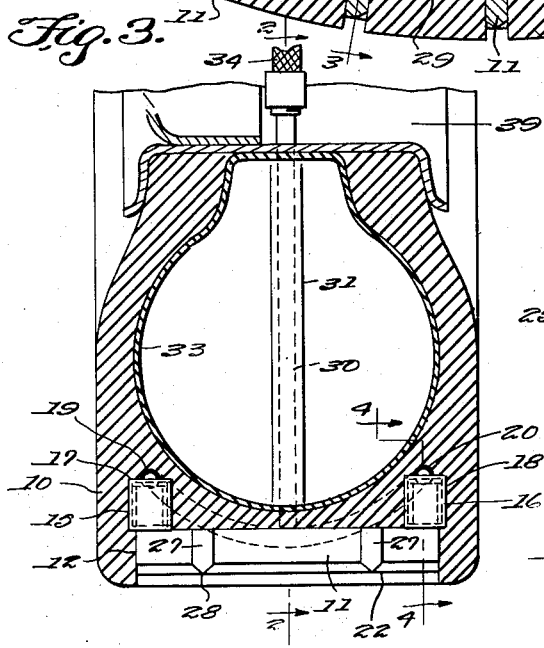
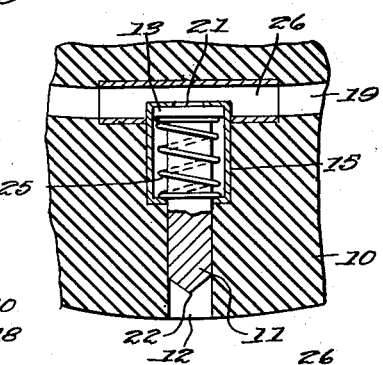
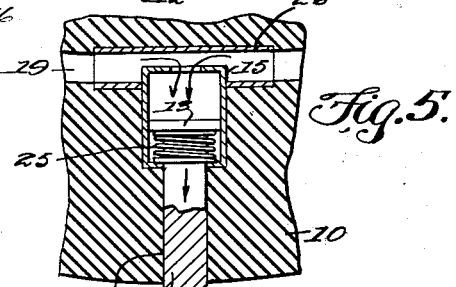
INVENTOR.
James W. Donegan,
BY *Victor J. Evans & Co.*
ATTORNEYS March 23, 1954   J. W. DONEGAN   2,672,908
NONSKID MOTOR VEHICLE TIRE
Filed June 4, 1951   3 Sheets-Sheet 3
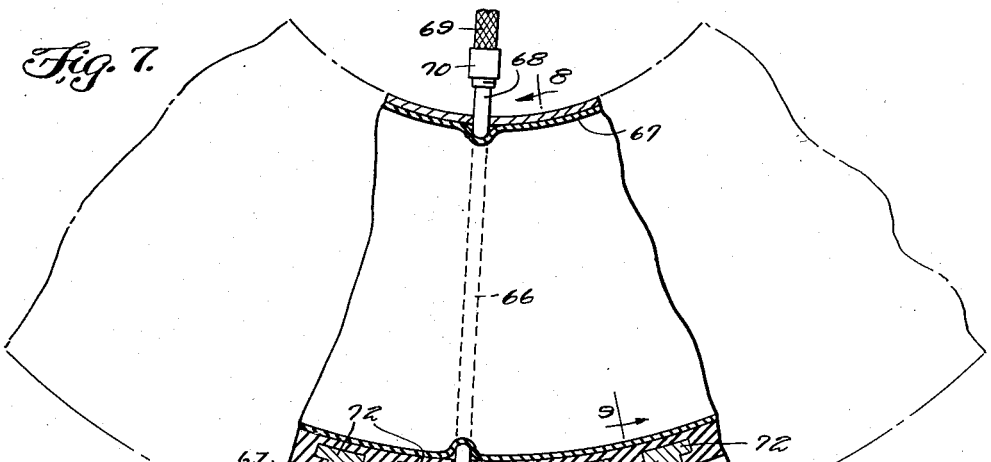
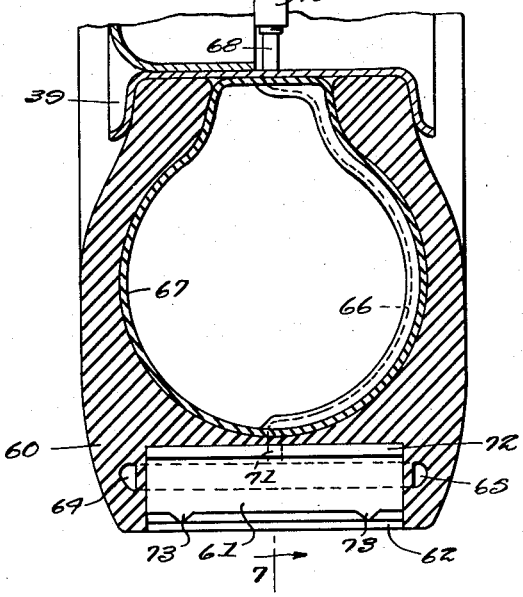
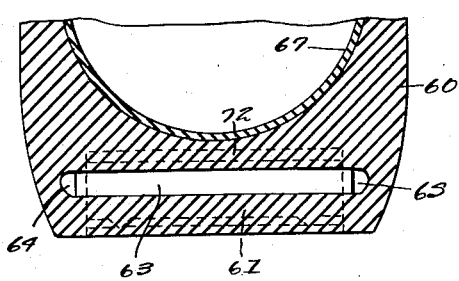
INVENTOR.
James W. Donegan,
BY Victor J. Evans & Co.
ATTORNEYS Patented Mar. 23, 1954

2,672,908

UNITED STATES PATENT OFFICE 2,672,908

NONSKID MOTOR VEHICLE TIRE

James Walter Donegan, East Hartford, Conn.

Application June 4, 1951, Serial No. 229,789

2 Claims. (Cl. 152—208)

This invention relates to a motor vehicle tire or shoe having non-skid elements incorporated in the outer surface wherein the elements are actuated by compressed air to positions extended from the surface of the tire when additional traction is required or when the tire is used on icy or otherwise slippery pavements or highways.

The purpose of this invention is to provide means for incorporating non-skid elements within the body of a motor vehicle tire whereby the elements may readily be extended for use.

Various attempts have been made to incorporate non-skid devices in motor vehicle tires but where the elements are molded into rubber or other material of the tire it is difficult to obtain a permanent bond between the elements and body of the tire. With this thought in mind this invention contemplates a motor vehicle tire having transversely disposed slots in the outer surface with road gripping elements positioned in the slots and means whereby the elements are extended for use.

The object of this invention is, therefore, to provide means for incorporating gripping elements in the surface of a motor vehicle tire whereby the elements are adapted to be extended beyond the surface of the tire by the operator of the vehicle.

Another object of the invention is to provide means in a motor vehicle tire for forcing gripping elements incorporated in the tire outwardly.

Another object of the invention is to provide a means for deflating an outer section of a motor vehicle tire whereby gripping elements incorporated in the said outer section are permitted to extend beyond the peripheral surface of the tire.

A further object of the invention is to provide a motor vehicle tire having air pressure actuated elements incorporated in slots in the peripheral surface in which the elements are extended for use and in which the tire is of a comparatively simple and economical construction.

With these and other objects and advantages in view the invention embodies spaced transversely disposed metal bars incorporated in slots in the peripheral surface of a motor vehicle tire with compressed air cylinders positioned at the ends of the bars and means for supplying air under pressure to the cylinders for driving the bars outwardly of the tire and also means whereby the outer section of the tire may be deflated to permit the said outer section to be compressed inwardly whereby metal elements incorporated therein are extended for use.

Other features and advantages of the invention will appear from the following description taken in connection with the drawings wherein:

Figure 1 is a diagrammatic view illustrating pneumatic connections of a pump and reservoir to air pressure channels in tires on the wheels of a motor vehicle.

Figure 2 is a longitudinal section taken on line 2—2 of Figure 3 showing transversely disposed valves in slots in the outer surface of the tire and showing an air connection extended through the inner tube of the tire.

Figure 3 is a cross section through the tire shown in Figure 2 being taken on line 3—3 thereof.

Figure 4 is a detail showing a section taken on line 4—4 of Figure 3 illustrating one of the cylinders on the ends of the bars with the air pressure relieved.

Figure 5 is a detail showing a section similar to that shown in Figure 4 wherein the bar is forced outwardly by air pressure applied to the inner end of the cylinder.

Figure 6 is a detail illustrating one of the bars of the type shown in Figures 2 and 3.

Figure 7 is a view showing a longitudinal section through a tire, taken on line 7—7 of Figure 8, illustrating a modification wherein spaced bars are rigidly held in the outer surface of the tire and the outer part of the tire is provided with air cushions which, when deflated, permit the outer part of the tire to be pressed inwardly so that the outer edges of the bars will be extended.

Figure 8 is a cross section taken on line 8—8 of Figure 7 illustrating the bars and the connecting means therefor.

Figure 9 is a similar section taken on line 9—9 of Figure 7 showing the cross section of the tire between the bars.

Figure 10 is a section, similar to that shown in Figure 7 illustrating the tire with the cushion forming the outer part of the tire deflated so that the outer edges of the bars are extended.

Figure 11 is a detail illustrating one of the bars used in the type of the device illustrated in Figures 7 to 10.

Figure 12 is a vertical section through a motor vehicle wheel illustrating a method of connecting compressed air to air channels in a tire of the type illustrated in Figures 2 and 7.

Referring now to the drawings wherein like reference characters denote corresponding parts the improved non-skid motor vehicle tire of this invention includes a tire casing or shoe 10 having bars 11 slidably mounted in slots 12 in the outer surface with the ends of the bars provided with pistons 13 and 14 and with the pistons slidably mounted in cylinders 15 and 16, respectively positioned in openings 17 and 18 incorporated in the body of the tire.

With the parts arranged in this manner air, or other fluid, supplied under pressure to continuous channels 19 and 20 in the tire enters the cylinders 15 and 16 through openings 21 in the inner ends forcing the pistons 13 and 14 therein outwardly whereby the beveled edges 22 on the outer ends of the bars 11 are extended beyond the surface of the tire, as shown in Figure 5.

The pistons 13 and 14 are connected to the bars with stems 23 and 24 and springs 25 around the stems withdraw the bars 11 when the pressure is relieved.

As illustrated in Figures 4 and 5 the inner ends of the pistons may engage the inner ends of the cylinders to limit inward movement of the bars and the inner ends of the cylinders may be provided with tubular extensions 26 whereby the cylinders are located in the channels 19 and 20.

The bars 11 may be provided with extensions or wings 27 that may be positioned at suitable points throughout the lengths of the bars and the wings are also provided with beveled outer edges 28.

Air is supplied to the channels 19 and 20 through a cross connection 29 which extends from a tube 30 extended through a tubular section 31 of an inner tube 33 of the tire 10. The inner end of the tube 30 is connected by a hose connection 34 to an annular recess 35 in a ring 36 that is mounted on a backing plate 37 of a brake drum 38. The ring 36 rotates with the wheel 39 and tire 10 and the base section or ring 40 that is provided with a tongue 41 which extends into the recess 35, is mounted on the backing plate by clip angles 42, as shown in Figure 12, or by other suitable means. The plate 37 and the ring or base 40 are stationary and air is supplied to the recess 35 by a hose or tubular connection 43 which is connected to a reservoir 44 by tubes 45 and 46. The tube 45 is provided with a check valve 47 and a valve 48 in the tube 46 is controlled by a hand lever 49 on which is a gear 50 that meshes with a gear 51 on a stem 52 of a valve 53 which opens the tube 45 to the atmosphere as the valve 48 is closed. With the valves 48 and 53 connected by the gears 50 and 51 the valve 53 is closed as the valve 48 is opened. A similar tube 43 extends from the fitting 54 to a ring 55 positioned on the brake backing plate of the wheel on the opposite side of the vehicle.

The air reservoir 44 is provided with a pump 56 that may be driven from a suitable moving part of the vehicle and a safety valve 57 may be provided on the reservoir.

The control lever 49, may be actuated to admit air under pressure to the channels 19 and 20 whereby the transversely disposed bars 11 are forced outwardly to the position shown in Figure 5 when additional traction is desired or when a vehicle upon which the tire is mounted is traveling over icy pavement or the like.

In the design illustrated in Figures 7 to 11 a tire 60 is provided with transversely positioned bars 61 and these bars, which are T-shaped in cross section, are mounted in slots 62 and are positioned between transversely disposed channels 63, the ends of which are connected to channels 64 and 65 that extend around the tire. Air is applied to the transverse channels 63 and longitudinally disposed channels 64 and 65 through a tube 66 that may be positioned on the outside of the inner tube 67 and that may extend around the inner surface of the tire 60, the outer end being connected by a nipple 68 to a hose 69, similar to the hose 34, by a coupling member 70. The opposite end of the tube 66 which may be formed of flexible tubing, is connected to one of the transverse channels 63, as shown at the point 71, in Figure 7.

The bars 61 are provided with base plates or flanges 72 and the outer edges may be provided with projections 73, as shown in Figure 11 to facilitate gripping.

With the parts arranged in this manner the valve 48 is open as the vehicle is in use whereby air under pressure is supplied to the transverse channels 63 which remain extended, as shown in Figure 7, and when it is desired to provide gripping means on the outer surface of the tire the valve 48 is closed whereby the valve 53 is opened and by this means air is relieved from the transverse channels 63 so that the outer surface of the tire is collapsed, as shown in Figure 10.

It will be understood that the supply tubes 30 and 66 may be used with either design as the tube 30 may be used with the bars shown in Figures 7 to 11 and the flexible tube 66 may be used with the type of bars shown in Figures 2 to 6 inclusive.

It will be noted that with the device shown in figures 7 to 11 air is maintained under pressure in the channels 63 continuously as the vehicle is used and when it is desired to use the non-skid elements or bars air pressure is relieved whereby the outer surface of the tire collapses so that the V-shaped edges of the bars protrude beyond the surface of the tire. After use of the non-skid bars the air may again be supplied to the cross channels 63 whereby the outer cushion of the tire is expanded so that the material of the tire extends beyond the outer edges of the bars. By this means the tire may be used in the conventional manner and may also be used to prevent skidding, as may be desired.

It will be understood that modifications may be made in the design and arrangement of the parts without departing from the spirit of the invention.

What is claimed is:

1. In a motor vehicle tire, the combination which comprises an outer casing having an inner tube therein, and having spaced radially disposed transversely positioned slots in the outer peripheral surface, said outer casing having transversely disposed channels positioned between the said slots and longitudinally positioned channels connecting the ends of said transversely disposed channels, and bars T-shaped in cross section positioned in the said slots with the outer ends of the bars spaced inwardly from the outer surface of the tire where there is compressed air in the channels between the slots, and with the edges of the bars extended beyond the surface of the tire when the air pressure of the channels between the slots is relieved.

2. A motor vehicle tire comprising an inner tube, an outer casing in which the inner tube is positioned, said casing having spaced radially disposed transversely positioned slots in the peripheral surface, bars T-shaped in cross section positioned in said transversely positioned slots of the casing, transversely disposed enclosed channels positioned between the slots in the casing, a pair of annularly disposed channels in said casing connected to the ends of said transversely disposed channels, and a tube positioned in said casing and connected to one of said transversely positioned channels for admitting compressed air to said channels whereby as the channels are expanded by reason of the compressed air the surface of the casing is extended beyond the outer edges of the bars and whereby upon release of said compressed air from said channels the peripheral surface of the casing is deflated and contracted whereby the edges of the bars extend beyond the peripheral surface of the casing.

JAMES WALTER DONEGAN.

References Cited in the file of this patent

UNITED STATES PATENTS

| Number | Name | Date |
|---|---|---|
| 2,217,122 | Lowry | Oct. 8, 1940 |
| 2,480,548 | Carhart | Aug. 30, 1949 |
| 2,491,491 | Freygang | Dec. 20, 1949 |